May 22, 1956     T. E. FINCH     2,747,074
ELECTRIC SOLDERING IRON
Filed May 24, 1949
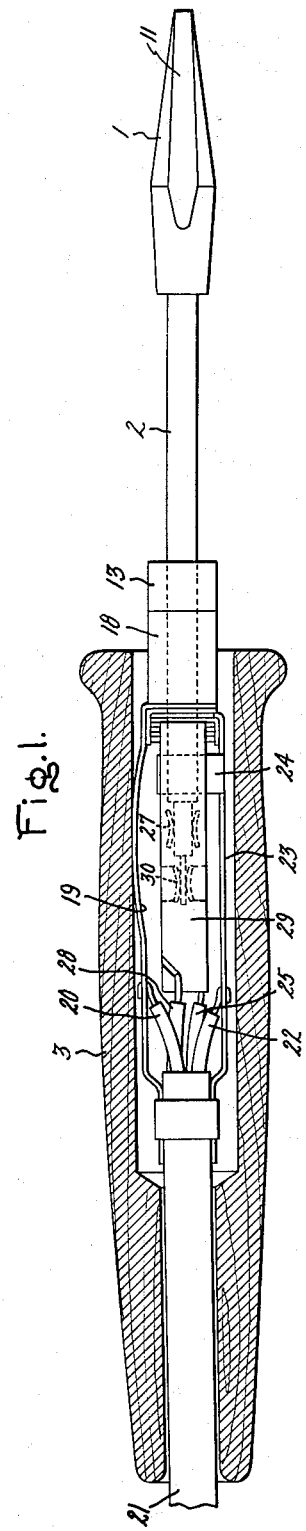
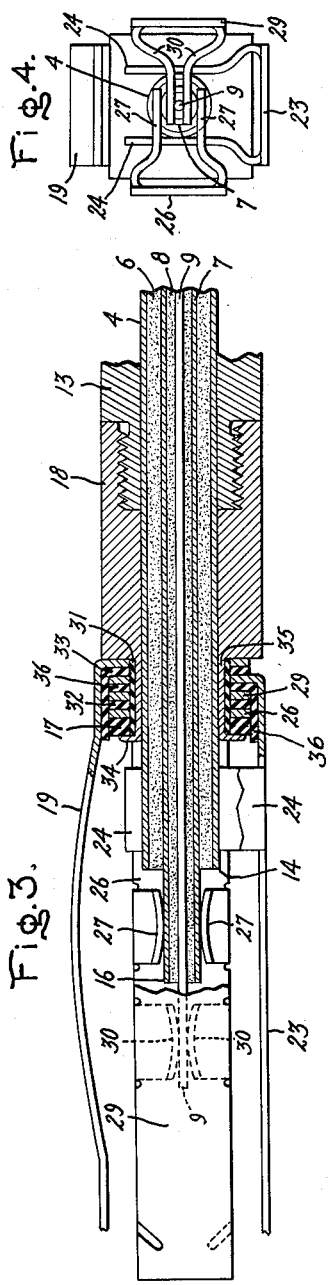
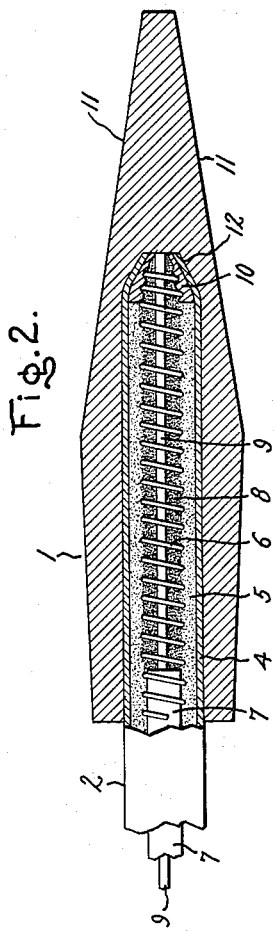
Inventor:
Thomas E. Finch,
by Claude A. Mott
His Attorney.

United States Patent Office 2,747,074
Patented May 22, 1956

2,747,074

ELECTRIC SOLDERING IRON

Thomas E. Finch, Pittsfield, Mass., assignor to General Electric Company, a corporation of New York Application May 24, 1949, Serial No. 94,979

8 Claims. (Cl. 219—26)

This invention relates to electric soldering irons and more particularly to electric soldering irons which have built-in thermocouples for providing automatic control of the temperature of the soldering irons.

An object of my invention is the provision of a soldering iron having a thermocouple incorporated in the heating unit which is accurately responsive to the temperature of the soldering surfaces. A further object of the invention is the provision of a practical and reliable soldering iron incorporating such a combined heating unit and thermocouple which is simple in construction and inexpensive to manufacture.

A thermocouple is formed by joining two dissimilar pieces of metal. When the junction of these two pieces of metal is heated, a difference in electrical potential between the two pieces results, and if the two pieces of metal are connected with each other through an external electrical circuit, current will flow through the junction of the two metals and through the electrical circuit thus completed. Thermocouples are well known and have been in use for a considerable length of time in connection with heating and other devices where it is necessary to measure or record heat, or an indication of temperature is necessary for the actuation of automatic heat control devices. Thermocouples have not been generally used with soldering irons, however; most of these being arranged to operate with the heat on continuously or with manual or non-automatic control of the heating current.

With the increasing use of soldering irons in the electronics and telephone industries and other similar industries, it is important that soldering irons adaptable for automatic temperature control be provided, particularly in the smaller sizes which are used in large quantities for making the myriad of small electrical connections encountered in these industries. Fortunately, small soldering irons are well adapted to automatic temperature control because the small mass of a small soldering head allows the head to heat and cool quickly in response to the introduction or removal of heat from the soldering surface, which in turn permits quick action by a controller responsively to changes in the output of a thermocouple. It is an object of my invention to incorporate in a soldering iron a heating unit having a built-in thermocouple in a manner such that the output of the thermocouple responds quickly and accurately to temperature changes at the soldering surface or surfaces of the soldering iron whereby the input to the heating unit may be changed to maintain a substantially uniform soldering temperature.

In carrying out my invention in one form, I provide a soldering iron which has at one end a hollow soldering head provided with a cavity extending from the end opposite the tip the greater portion of the length of the head so that the inner extremity of the cavity is near the tip. Positioned in the cavity in the head is a rod-like heating unit which has in it both heating and thermocouple circuits. The outer sheath of the heating unit is of metal and serves as a common conductor for the heating and thermocouple circuits. Concentrically located inside the outer metal sheath are a helical heating coil and a center metal wire of a different metal than the outer shell of the unit, separated by layers of insulation. The center metal wire and the outer metal shell are joined at the inner extremity of the heating unit at the bottom of the cavity in the soldering head to form a thermocouple junction. At the opposite extremity of the heating unit is a handle which has included in it electrical connections for an external source of electrical heating energy and for an external temperature regulating device.

For a more complete understanding of my invention, reference should be had to the accompanying drawing, Fig. 1 of which is an enlarged outline view of a soldering iron incorporating my invention with the handle shown in section; Fig. 2 is a partial sectional view, enlarged still more than Fig. 1, showing a side view of the soldering head with the heating coil and thermocouple junction of the heating unit therein; Fig. 3 is a partial sectional view of the handle end of the heating unit and the electrical connections within the handle drawn to approximately the same scale as Fig. 2; and Fig. 4 is an end view of the connector assembly shown in Fig. 3.

Referring to Fig. 1 of the drawing, the three principle elements of a typical soldering iron embodying my invention can be seen: the soldering head, or tip 1, the heating unit 2, and the handle 3. In Fig. 2 the construction of heating unit 2 and the relation of unit 2 to soldering tip 1 can be seen in detail.

Heating element 2 comprises an outer metal sheath 4 which serves as a common conductor for both the heating circuit and the thermocouple circuit in a manner which is explained below. Immediately inside outer sheath 4 and concentric therewith is a layer of compacted magnesium oxide powder 5. Magnesium oxide is adaptable here because it has good electrical insulating qualities and at the same time is a good conductor of heat. Other materials, particularly some other metal oxides, have similar properties and may also be used.

Immediately inside the layer of magnesium oxide and concentric therewith is a helical coil 6 of resistance heating wire which may, for example, be made of a nickel-chromium alloy. The heating coil 6 lies entirely within soldering tip 1 with the remainder of the corresponding space immediately inside the layer of magnesium oxide along the remainder of the length of the heating unit being occupied by an electrically conductive metal tube 7. Immediately inside the heating coil 6 and tubular member 7 is a concentric layer of powdered ceramic material 8; ceramic material is used here primarily because of its electrical insulating properties. In the center of the concentrically composed heating unit is a metal wire 9 made of a different metal than outer sheath 4.

At the inner extremity of heating coil 6 within tip 1 is a metal terminal member 10 which is preferably of the same metal as outer sheath 4. Heating coil 6 is securely fastened to member 10 and also to tubular conductor 7 at the opposite extremity of the heating coil. Member 10 is securely joined to metal sheath 4. The electrical circuit within the heating unit for heating current is formed by outer sheath 4, member 10, coil 6 and metal tube 7.

Outer metal sheath 4 and member 10 may, for example, be made of iron. The center wire 9 is of a dissimilar metal or metal alloy which is heat resistant, such as an alloy of nickel and copper, or an alloy of nickel and chromium. Member 10 and center wire 9 are securely joined at the inner extremity of wire 9 and, being of dissimilar metals or alloys, they form a thermocouple junction at that location. Wire 9 forms one side of the thermocouple and sheath 4, together with member 10, the other. Thus, sheath 4 serves as a common conductor in the heating unit for the thermocouple circuit and the heating circuit. The concentric arrangement of heating unit 2 makes it possible to locate the thermocouple junction close to the soldering surface 11 of soldering head 1 by utilizing a deep cavity in soldering tip 1 extending nearly to the soldering surface. In addition, the circular longitudinal opening extending the greater part of the length of the tip makes it possible to locate the heating coil entirely within the soldering tip so that substantially all of the heat produced by the heating coil is transferred to the soldering tip 1 with relatively little of the heat being conducted along the heating unit toward the handle.

In the manufacture of heating unit 2, one or more cylindrical pieces of ceramic material are placed on wire 9 so that the wire is completely covered thereby. A preformed helical heating coil 6 is then placed on the outside of the ceramic material, and terminal member 10 and metal tube 7 are added at the ends of the heating coil. Coil 6 is then securely joined to conductor 7, preferably by brazing or welding. Terminal member 10 has initially an inside threaded portion into which coil 6 is screwed, after which the terminal is swaged slightly to make a solid connection between them. After conductor 7 and terminal 10 are joined to coil 6, the assembled parts are inserted and centered in outer sheath 4 and the intervening space is filled with powdered magnesium oxide. The entire heating element assembly is then swaged to reduce the diameter a predetermined amount and compact the magnesium oxide 5. The swaging process changes the previously solid ceramic material into powdered ceramic material 8. After the entire heating unit has been swaged, a chamfer 12 is swaged at the inner extremity of the heating unit to cause that end of the unit to correspond closely in configuration with the cavity in the tip 1, after which this end of the unit is ground off to clean center thermocouple conductor 9 and square the end of the heating unit so that it will fit snugly against the bottom of the cavity in abutting relation therewith. The thermocouple joint is then made by brazing together the extremities of conductor 9, member 10, and sheath 4, after which the heating unit 2 is inserted in tip 1 and bonded to it by being brazed or welded over substantially the entire common surface between them to provide the maximum heat transfer. This latter operation also effectively seals the thermocouple junction off from the outside air so that it cannot oxidize or otherwise become contaminated.

At the opposite end of heating unit 2, as shown in Figs. 1 and 3, the heating unit is provided with a threaded terminal member 13 which is securely joined to sheath 4. Terminal 13 provides for the connection to the heating unit of one side of the source of heating current. Sheath 4 extends beyond terminal 13 into the handle 3 to form a shoulder 14 which provides for one connection to the thermocouple circuit. Tubular conductor 7 extends still further into the handle beyond sheath 4, forming a shoulder 16 which provides for an electrical connection to the other side of the source of heating current. Center wire 9 extends beyond the remainder of the components of the heating unit to provide the second connection for the thermocouple circuit.

Electrical connections to the heating unit are made within handle 3, as shown in Figs. 1 and 3. The threaded portion of member 13 engages a corresponding internally threaded portion on a terminal member 18. Member 18 is joined by a resilient conductive member 19 to a conductor 20 of a four-conductor cable 21. Shoulder portion 14 on sheath 4 is connected to a second conductor 22 of the four-conductor cable by means of a flat conductive member 23. Member 23 has two vertically disposed prongs 24 thereon, as best seen in Fig. 4, which engage opposite sides of sheath 4. Shoulder portion 16 of the tubular conductor 7 is connected to a third conductor 25 of the four-conductor cable by a flat conductive member 26 having two normally disposed prongs 27 thereon similar to prongs 24. Center conductor 9 of the heating unit is connected to the fourth conductor 28 of the four-conductor cable by a flat conductive member 29 having two normally disposed prongs 30 which engage opposite sides of conductor 9.

Conductive members 19, 23, 26 and 29 are all supported by member 18 as a part of a unitary structure, as illustrated in Fig. 3 of the drawing. Each of these four conductive members has a right angle portion at the end nearest member 18 with an opening therein which fits around a cylindrical insulating member 31. Member 31, in turn, is positioned around a ferrule 35 on member 18. The right angle portions of the conductive members are positioned around member 31, which insulates them from member 18, while members 26 and 29 are insulated from each other by a spacer 32 of insulating material. Member 19 makes contact with terminal 18 but is insulated from members 23, 29 and 26 by a spacer 33. Member 23 is insulated from members 29 and 26 by a spacer 36. Thus, members 19, 23, 29 and 26 are all insulated from each other.

Members 19, 23, 26 and 29, with the intervening layers of insulation, are assembled on terminal 18 before the elongated portions of the conductive members are bent at right angles. Furthermore, when these members are assembled, the outward radial projection 34 at the extremity of ferrule 35 has not been formed. Therefore, members 19, 23, 26 and 29 can be readily placed in position around ferrule 35 and insulating member 31. After they have been so located, and an additional insulating spacer 17 has been placed on conductive member 26, radial projection 34 is formed on ferrule 35 to secure them firmly in position. Thereafter the right angle bends are made in members 19, 23, 26 and 29 to bring the connector assembly into the form shown in Figs. 1 and 3. The unitary connector assembly is held within handle 3 by resilient member 19 which engages the handle with sufficient pressure to hold the connector assembly when the latter is inserted in the handle. It will be understood that the conductors in cable 21 are joined to the respective members in the connector assembly before the latter is pulled into the handle.

In order to assemble a complete soldering iron after heating unit 2 and combined handle and connector unit 3 have been manufactured separately, it is necessary only to screw terminal 13 of the heating unit into member 18. This causes center conductor 9, tubular conductor 7 and sheath 4 to be engaged by the proper prongs of the connector assembly and thereby connected to the correct conductors in the four-conductor cable. The concentric construction of the soldering iron in accordance with my invention, therefore, makes it easy to replace the heating unit and soldering head, it being necessary merely to unscrew one and insert another, with all connections being made automatically when the heating unit is screwed into the handle assembly.

Cable 21 connects the soldering iron to a suitable regulating, or control, device (not shown). There are a great many devices available for the regulation of an electrical circuit responsively to voltage or current signals received from a thermocouple, and such a control device is disclaimed as a part of my invention. Suffice to say here that the heating circuit of the soldering iron is intermittently energized and de-energized, or the current in the heating circuit is modulated, by a control device actuated by signals from the thermocouple.

In the operation of a soldering iron embodying my invention, the heat generated by coil 6 is conducted by magnesium oxide powder 5 and metallic member 4 to soldering tip 1. When a soldering surface 11 of tip 1 is applied to pieces which are to be soldered, heat is conducted away from surface 11 by these pieces. This reduces the temperature of head 1, particularly the portion adjacent soldering surface 11. When this occurs, the thermocouple junction causes less signal current to flow in the thermocouple circuit, thus indicating to the external control device that additional heat is needed. This results in the control device causing heating coil 6 to be energized for a sufficient length of time to restore tip 1 to the desired temperature, after which heating coil 6 is de-energized until additional heat is required. Alternatively, a control device may be used in some cases which increases and decreases the heating current in response to signals from the thermocouple instead of turning the current on and off. Such intermittent operation means that the soldering iron receives all the heat that is necessary to maintain it at the desired temperature but no excess heat is received to overheat the soldering iron. In this way, electrical energy is used most efficiently and at the same time the soldering iron is not subjected to unnecessarily high temperatures.

It will be readily understood that sheath 4 of the heating unit serves as a common conductor for the thermocouple circuit and the heating circuit of the soldering iron. The source of heating current is connected to sheath 4 through terminal 13, while the external thermocouple responsive control circuit is connected to sheath 4 through prongs 24 which engage shoulder 14 on the sheath. Two separate conductors, 20 and 22, respectively, are, therefore, utilized to connect the source of heating current and the thermocouple responsive circuit to sheath 4. One modification of my invention provides for the omission of conductor 22, member 23 with prongs 24 thereon, and the shoulder 14 on sheath 4. In this modification, conductor 20, member 19 and member 18 serve as a common circuit for both the thermocouple responsive circuit and the heating current, in the same manner as sheath 4 within the heating unit.

Another modification of the invention is the use of a pair of thermocouple wires in place of the single center wire 9 in the heating unit, making it unnecessary for the sheath 4 to be used as one side of the thermocouple circuit. In this modification, the pair of thermocouple wires runs the entire length of the heating unit so that the thermocouple junction is still at the same location near the soldering surface. The heating unit and the handle member are otherwise the same except that the connections are modified so that the two innermost terminals on the heating unit are connected to the external thermocouple responsive control circuit while the two outermost terminals are connected to the external heating circuit.

My invention is useful also in heating units for devices other than soldering irons. It can be used in any case in which it is desired automatically to maintain the temperature of the material being heated by thermocouple responsive regulation of the current in the heating coil.

While I have illustrated and described one preferred embodiment of my invention, together with two modifications thereof, many additional modifications will occur to those skilled in the art. It should be understood, therefore, that I intend to cover by the appended claims all such modifications as fall within the true spirit and scope of my invention.

What I claim as new and desire to secure by Letters Patent of the United States is:

1. An electric soldering iron comprising a soldering head having a cavity therein, an elongated heating unit having one end corresponding closely in configuration with said cavity and positioned in said cavity in abutting relation therewith, said soldering head and said end being bonded together over substantially all of their abutting surfaces, said heating unit comprising an outer tubular metal sheath, a layer of electrically insulative heat conductive material positioned against the inner surface of said sheath, a helical coil of resistance heating wire inside said layer of electrically insulative material, a layer of powdered ceramic material inside said coil, and a center metal member made of a different metal than said outer sheath, said outer sheath and said center member being joined within said soldering head to form a thermocouple junction, said sheath and said coil being connected within said soldering head whereby said sheath forms a common conductor for said coil and said thermocouple junction, and a combined handle and connector member positioned on the other end of said heating unit.

2. A concentrically constructed electric heating unit comprising an outer metal sheath of circular cross section, a layer of electrically insulative heat conductive material concentrically positioned immediately inside said sheath, a coil of resistance heating wire concentrically positioned immediately inside said layer of heat conductive material, a concentric layer of electrically insulative material immediately inside said coil, and a conductor of a dissimilar metal to the sheath positioned within said last named layer of electrically insulative material substantially on the center line of the heating unit, said conductor being joined to said sheath at one extremity of the heating unit to form a thermocouple junction, said sheath also being joined to said coil whereby said sheath serves as a common conductor for said coil and said thermocouple.

3. An electric soldering iron comprising a tapered soldering head having a circular longitudinal opening extending from the end opposite the tapered portion the greater part of the length thereof, an elongated concentrically constructed heating element positioned with one end in said opening completely filling it, said heating element being securely joined to said soldering head, said heating element comprising an outer tubular metal sheath, a layer of compacted magnesium oxide powder immediately inside said sheath, a helical coil of high resistance electrical heating wire immediately inside said layer of magnesium oxide for a portion of the length of the heating element with an electrically conductive tubular member occupying the space immediately inside said magnesium oxide layer for the remainder of the length of said element, a layer of powdered ceramic material immediately inside said coil and said tubular member, and a center electrically conductive metal wire made of a different metal than said outer sheath, said center wire and said outer sheath being joined at the inner extremity of the portion of said heating element which extends into said soldering head to form a thermocouple junction, said coil lying completely inside said soldering head and being connected therein to said tubular conductive member and said outer sheath, said outer sheath thus forming a common conductor for said coil and said thermocouple, and a combined handle and connector member positioned on the opposite end of said heating element, said member comprising a hollow handle portion containing a plurality of flat conductive members having a pair of normally disposed prongs on each for engaging respectively the outer sheath, the tubular conductor and the center wire of said heating element.

4. An electric soldering iron having a heating unit comprising an outer tubular metal sheath having a threaded portion near one end thereof, a layer of compacted magnesium oxide powder immediately inside said sheath, a resistance heating coil inside said layer of magnesium oxide powder along a portion of the length of said sheath adjacent the end opposite the threaded portion, a tubular electrical conductor positioned immediately inside said magnesium oxide powder along the remainder of the length of said sheath, a layer of powdered ceramic material immediately inside said heating coil and said tubular conductor, and a metal wire of a different metal than said outer sheath positioned substantially in the center of said heating unit within said layer of powdered ceramic material, said center wire and said outer sheath being joined at the extremity of the heating unit adjacent said heating coil to form a thermocouple junction, one end of said heating coil being joined to said tubular conductor and the other end to said outer sheath whereby the outer sheath is a common conductor for said heating coil and said thermocouple junction, a soldering tip positioned in abutting heat conducting relation on the end of the heating unit having said thermocouple junction, and a combined handle and connector member on the opposite end of said heating unit, said handle and connector member comprising an internally threaded conductive member for engaging the threaded portion on said sheath and connecting said sheath to a first electrical conductor, a pair of prongs for engaging said outer sheath and connecting said sheath to a second electrical conductor, a pair of prongs for engaging said tubular conductor and connecting said tubular conductor to a third electrical conductor, and a pair of prongs for engaging said center wire and connecting said center wire to a fourth electrical conductor.

5. An electric soldering iron having an elongated heating element which comprises a metal sheath of substantially circular cross section having a raised threaded portion near one end, a thermocouple junction at the opposite extremity of said sheath, a resistance heating coil within said sheath and insulated therefrom, said sheath being connected to said thermocouple junction and one end of said heating coil whereby it forms a common conductor for both, a tubular conductor connected to the other end of said heating coil concentrically positioned within said sheath and insulated therefrom, said tubular conductor extending beyond said sheath at the extremity opposite said thermocouple junction whereby provision is made for electrical connections to said tubular conductor, and an insulated electrical conductor positioned within said tubular conductor substantially on the center line of said sheath forming a second conductor for said thermocouple junction, said insulated conductor extending beyond said tubular conductor at the extremity of the heating element opposite said thermocouple junction whereby provision is made for electrical connections to said insulated conductor, a soldering tip positioned on the end of said heating element having said thermocouple junction, and a hollow handle having provisions for electrical connections to said heating element positioned on the end of said heating element opposite said tip, said provisions including a conductive terminal member having an inside threaded portion for engaging the threaded portion of said sheath, a resilient conductive member connecting said terminal member to a first electrical conductor, a first flat conductive member for connection to a second electrical conductor, said first flat conductive member having a pair of normally disposed prongs for engaging said outer sheath, a second flat conductive member for connection to a third electrical conductor, said second flat conductive member having a pair of normally disposed prongs for engaging said tubular conductor, and a third flat conductive member for connection to a fourth electrical conductor, said third flat conductive member having a pair of normally disposed prongs for engaging said insulated electrical conductor.

6. An electric soldering iron comprising an elongated heating unit having a metal sheath of substantially circular cross section provided with a raised threaded portion near one end of the sheath, a thermocouple junction at the opposite extremity of said sheath, a resistance heating coil within said sheath and insulated therefrom, said sheath being connected to said thermocouple junction and one end of said heating coil whereby it forms a common conductor for both, a tubular conductor connected to the other end of said heating coil concentrically positioned within said sheath and insulated therefrom, said tubular conductor extending beyond said sheath at the extremity opposite said thermocouple junction whereby provision is made for electrical connections to said tubular conductor, and an insulated electrical conductor positioned within said tubular conductor substantially on the center line of said sheath forming a second conductor for said thermocouple junction, said insulated conductor extending beyond said tubular conductor at the extremity of the heating unit opposite said thermocouple junction whereby provision is made for electrical connections to said insulated conductor, a soldering tip positioned at the end of said heating unit having said thermocouple junction, and a hollow handle having provisions for electrical connections to said heating unit therein positioned at the end of said heating unit opposite said thermocouple junction, said provisions including a cylindrical conductive terminal member having an inside threaded portion adjacent one end of said member for engaging the threaded portion of said sheath, and a ferrule portion on the opposite end of said terminal member, a first resilient flat conductive member connecting said terminal member to a first electrical conductor, a second flat conductive member for connection to a second electrical conductor, said second flat conductor having a pair of normally disposed prongs for engaging the outer sheath of said heating unit and a substantially right angle portion at one extremity having an opening therethrough, a third flat conductive member for connection to a third electrical conductor, said third flat conductive member having a pair of normally disposed prongs for engaging the tubular conductor of said heating unit and a substantially right angle portion at one extremity having an opening therethrough, a fourth flat conductive member for connection to a fourth electrical conductor, said fourth flat conductor having a pair of vertically disposed prongs for engaging said insulated electrical conductor and a substantially right angle portion at one extremity having an opening therethrough, the right angle portions of said second, third and fourth flat conductors being positioned around the ferrule portion of said terminal member, said right angle portions being insulated from each other and from said terminal member, and means for rigidly clamping said right angle portions and intervening insulation on said terminal member whereby a unitary connector structure is formed, said first resilient flat conductive member engaging the inner surface of the handle and supporting said unitary structure therein.

7. In a temperature controlled soldering iron for use with a remote control device for varying the electric power supplied to a soldering iron, the combination of a metal tip having a work area at one end and a cavity extending inwardly from the other end, a heating element disposed within the cavity in said tip, said heating element comprising a concentrically constructed electric heating unit comprising an outer metal sheath of circular cross section, a layer of electrically insulative heat conductive material concentrically positioned immediately inside said sheath, a coil of resistance heating wire concentrically positioned immediately inside said layer of heat conductive material, a concentric layer of electrically insulative material immediately inside said coil, and a conductor of a dissimilar metal to the sheath positioned within said last layer of electrically insulative material substantially on the center line of the heating unit, said conductor being joined to said sheath at one extremity of the heating unit to form a thermocouple junction, said sheath also being joined to said coil whereby said sheath serves as a common conductor for said coil and said thermocouple.

8. In a temperature-controlled soldering iron for use with a remote control device for varying the electric power supplied to the soldering iron, the combination of a metal tip having a work area at one end and a cavity extending inwardly from the other end, and a separately manufacturable heating unit disposed within the cavity in said tip, said heating unit comprising, an elongated metal sheath of substantially circular cross-section, closure means, operable as a conductor for a thermocouple junction, located in one extremity of said sheath and in electrical connection therewith, a heating coil within said sheath and separated therefrom by a layer of electrically insulative heat conductive material, said heating coil being in electrical connection with said sheath which sheath thereby forms a common conductor for said heating coil and said closure means, a tubular conductor concentrically positioned within said sheath and insulated therefrom, said tubular conductor being connected at the other end of said heating coil, and an insulated electrical conductor positioned within said tubular conductor substantially on the center line of said sheath forming a second conductor for said thermocouple junction.

References Cited in the file of this patent

UNITED STATES PATENTS

| | | |
|---|---|---|
| 1,156,317 | Santos et al. | Oct. 12, 1915 |
| 1,671,344 | Chapman | May 29, 1928 |
| 2,062,940 | Samuels | Dec. 1, 1936 |
| 2,159,869 | Thomas et al. | May 23, 1939 |
| 2,167,389 | Kuhn et al. | July 25, 1939 |
| 2,304,211 | Sparrow | Dec. 8, 1942 |

FOREIGN PATENTS

| | | |
|---|---|---|
| 588,216 | Great Britain | May 16, 1947 |